Patented June 11, 1940

2,203,869

UNITED STATES PATENT OFFICE 2,203,869

CELLULOSE ETHERIFICATION PROCESS

Frederick C. Hahn, Wilmington, Del., assignor to E. I. du Pont de Nemours & Company, Wilmington, Del., a corporation of Delaware No Drawing. Application September 19, 1934, Serial No. 744,669

20 Claims. (Cl. 260—231)

This invention relates to the preparation of cellulose derivatives and more particularly to the preparation of cellulose ethers. Specifically it relates to the preparation of improved cellulose ethers by the action of etherifying agents on alkali cellulose in the presence of wetting agents.

The preparation of cellulose ethers has been the subject of numerous patents. Catalytic agents such as copper, nickel, and iron salts have been disclosed for use in this reaction. Inert diluents of various kinds have been disclosed in facilitating the reaction. These inert diluents, such as dioxan, are used in relatively large quantities, generally in amounts at least equal to that of the etherifying agent. They function as solvents for the etherifying agent and solvents for the resulting cellulose ether. The etherification of cellulose is a more or less heterogeneous reaction, the surface of the cellulose fiber being first etherified and as the etherifying agent penetrates the fiber to layers of unreacted cellulose the etherification progresses. The solution of the etherified cellulose on the surface of the fiber by the solvent exposes a fresh surface for the reaction and in that manner hastens the etherification.

This invention has as an object the preparation of cellulose ethers of improved quality. A further object is the preparation of more uniform cellulose ethers of improved plastic properties and film characteristics. A further object is the provision of a method for etherifying cellulose which is more economic than the processes hitherto used in consumption of reagents and in time of reaction.

These objects are accomplished by the following invention wherein cellulose ethers are prepared by the action of etherifying agents on cellulose in the presence of wetting agents.

I find that the reaction between alkali cellulose and etherifying agents is considerably faster when these reactants are brought into intimate contact. Due however to the fact that the etherifying agent is insoluble in water and does not wet the alkali cellulose, the contact of the reactants is very poor in the process heretofore used. By the use of the wetting agents of the present invention, I find that the contact between the alkali cellulose and the etherifying agent is greatly increased due to reduced interfacial tension between the reactants, thus promoting greater uniformity of reaction and increased rate of etherification.

Having outlined above the general principles of the invention, the following applications thereof to certain specific instances are included for purposes of illustration and not in limitation.

Example 1

One hundred parts cellulose, 392 parts of caustic soda, 180 parts of water, 500 parts of ethyl chloride, 813 parts of benzene, and 10 parts of "Alkanol M" are introduced into an autoclave. The mixture is heated gradually to 150° C. over a period of 1–2 hours and then held at this temperature for 4 hours, during all of which time the contents of the autoclave are continually stirred. The reaction mixture is cooled, treated with water, steam distilled to remove the volatile solvents, and the ethyl cellulose is washed free from inorganic salts, and dried. The product is practically completely soluble in benzene, toluene, ethyl acetate, also in 80–20 alcohol-toluol mixture, and the resulting solutions give clear, tough and colorless films.

Example 2

Two hundred parts of cellulose is steeped for 1 hour in a 50% caustic soda solution, pressed to 727 parts and shredded for 1 hour. The alkali cellulose so produced is added to the autoclave along with 506 parts of caustic soda, 117 parts of water, 1626 parts of benzene, 1,000 parts of ethyl chloride, and 20 parts of "Alkanol M." The mixture is stirred, heated gradually to 150° C., and maintained at this temperature for 3–4 hours. The reaction mixture is cooled and then worked up in a manner similar to that described in Example 1. The product is soluble in benzene, toluene, acetone, alcohol, and ethyl acetate, and has excellent properties for such uses as plastics, film, lacquers, etc.

Example 3

Two hundred parts of cellulose is steeped in 50% caustic soda solution for 1 hour at ordinary temperature, pressed in 647 parts, and shredded for 1 hour. The resulting alkali cellulose, 700 parts of a slurry of caustic soda in benzene (1 part of caustic to 2 parts of benzene), 20 parts of water, 700 parts of ethyl chloride, 672 parts of benzene, and 20 parts of sodium isobutyrate are introduced into an autoclave. The mixture is heated gradually to 150° C. and held at this point for 3–4 hours during which time the mixture is constantly agitated. The autoclave is allowed to cool to room temperature and the reaction mixture worked up in the usual manner. The product has properties similar to those described in the previous examples.

Example 4

Two hundred seventy parts of cellulose (dry), 1060 parts of caustic soda, 2710 parts of ethyl chloride, and 20 parts of "Alkanol M" are agitated and heated in an autoclave at 100° C. for a period of 18–20 hours. At the end of the run the autoclave is allowed to cool to room temperature and the reaction mixture is worked up in the usual procedure described previously. The product dissolves in various solvents giving practically colorless solutions.

*Example 5*

One hundred sixty-two parts of cellulose is steeped in 44% caustic soda solution, pressed to 550 parts and shredded. The alkali cellulose which contains 162 parts of cellulose, 200 parts of caustic soda and 188 parts of water is treated with 16 parts of "Alkanol M" and shredded with 508 parts of benzyl chloride for 8–10 hours at 95°–100° C. The mixture is cooled, dispersed in benzyl alcohol, stirred, and coagulated in methanol. The coagulated material is filtered and extracted with methanol, washed with water containing a small amount of acetic acid, finally washed free from acid, and dried. The benzyl cellulose is soluble in toluene-alcohol mixture and gives clear, colorless, flexible films. The product is of excellent quality for lacquers, films, and plastics.

*Example 6*

The charge and conditions used in this example were similar to those described in Example 2 except that sodium isobutyl sulfonate was used as the wetting agent. The results and the character of the product were essentially the same as those obtained in Example 2.

In all of the foregoing examples the time of reaction for production of a product having a given solubility is greatly decreased over that necessary if the wetting agent were not used. Thus, in the process of Example 2 when no wetting agent is used it is necessary to continue the agitating and heating for a period of 6 to 8 hours to obtain a product of the same solubility and quality as that obtained in less time using a wetting agent. The improved quality of products made according to the invention is shown particularly by the absence of insoluble material and by the improved toughness of the films prepared from the products.

The process of the present invention is not limited to the use of wetting agents described in the foregoing examples but includes all materials which are inert toward the reactants, are soluble (or at least partly soluble) in the reaction mixture and effect a substantial reduction in the interfacial tension between the etherifying agent and the alkali cellulose. Other wetting agents which may be used with results similar to those disclosed in the above examples include the following: salts of saturated aliphatic monobasic acids containing 4 or more carbon atoms, oleates, soaps, sulfonated acid soaps, Turkey red oil, sodium petroleum sulfonates, sodium salts of aliphatic alcohol sulfates such as sodium lauryl sulfate and sodium salts of the sulfates of mixtures of saturated aliphatic alcohols such as may be obtained by the carboxylic hydrogenation of essentially saturated natural oils such as coconut oil or of the saturated aliphatic alcohol mixtures obtainable as by-products in the preparation of methanol by the hydrogenation of carbon monoxide, pine oil, etc.

A particularly desirable wetting agent is the "Alkanol M" disclosed in the above examples. This wetting agent or type of wetting agent consists of the alkali salts of the fatty acids obtainable by oxidation of the higher alcohols obtained in the catalytic hydrogenation of carbon oxides. These higher alcohols may be oxidized either by the method of Reid U. S. Patent 1,856,263 or by oxidation to the aldehyde and further oxidation to the acid. The major fraction of the alcohols utilized in the oxidation boils above 133° C. This may be separated into fractions having somewhat varying characteristics and giving acids of slightly varying characteristics. A particularly desirable fraction for use in the present invention contains saturated aliphatic monobasic acids of from 4 to 8 carbon atoms.

The time required to complete the etherification reaction and to obtain a given solubility in the etherified product depends on the reacting temperature and on the proportions of the reactants. Also, it depends to some extent on the specific wetting agent used and the ratio of wetting agent to principal reactants that is, cellulose and etherifying agent. The etherification reaction is continued until the product is substantially soluble in 20–80 mixture of alcohol-toluene, and in all cases I find that the time required to attain this degree of solubility is markedly less when using the wetting agent as described above than it is when a similar reaction is conducted without the wetting agent. In general, I prefer to use about 5–10% of the wetting agent based on the cellulose, but this proportion may vary within fairly wide limits providing that the time of treatment is controlled so as to obtain a product of the desired solubility under the conditions used.

The invention is not limited to ethyl cellulose and benzyl cellulose. The addition of "Alkanol M," sodium isobutyrate, and other wetting agents to the etherification reaction has similar advantages in the preparation of methyl cellulose, propyl cellulose, butyl cellulose, hydroxy ethers of cellulose obtained by interaction of alkali cellulose with ethylene chlorohydrin and epichlorohydrin, lauryl cellulose, isobutyl cellulose, and mixed ethers such as methyl ethyl cellulose, methyl butyl cellulose, ethyl benzyl cellulose, ethyl butyl cellulose, and ethyl lauryl cellulose, and in general in the etherification of cellulosic and of cellulose derivatives.

Cellulose ethers prepared according to the present invention are especially suitable for use in the manufacture of films, plastics, coating compositions, lacquers, artificial fibers, artificial bristles, and for use in safety glass because of their high flexibility, great strength, great clarity, and low water sensitivity, and are superior in these respects to ethers made by the prior art methods.

The above description and examples are intended to be illustrative only. Any modification of or variation therefrom which conforms to the spirit of the invention is intended to be included within the scope of the claims.

I claim:

1. Process for the preparation of ethyl cellulose, which comprises reacting about 100 parts cellulose with about 500 parts of ethyl chloride in the presence of about 180 parts of water, 392 parts of caustic soda, 813 parts of benzene, and 10 parts of a wetting agent essentially comprising the alkali salts of a mixture of aliphatic acids obtained by the oxidation of higher alcohols obtainable by the catalytic hydrogenation of carbon oxides.

2. Process for the preparation of ethyl cellulose, which comprises reacting cellulose with ethyl chloride in the presence of caustic soda, an inert diluent, and a wetting agent essentially comprising the alkali salts of a mixture of aliphatic acids obtained by the oxidation of higher alcohols obtainable by the catalytic hydrogenation of carbon oxides.

3. Process of claim 2, wherein the wetting agent is present in an amount of approximately 5% to 10%.

4. Process for the preparation of cellulose ethers, which comprises reacting cellulose with an etherifying agent in the presence of a caustic alkali, water, an inert diluent, and a wetting agent which is at least partly soluble in the reaction mixture, is inert toward the reactants, and has the property of effecting a substantial reduction in the interfacial tension between the etherifying agent and the alkali cellulose.

5. Process of claim 4, wherein the wetting agent is present in an amount of approximately 5% to 10%.

6. Process for the preparation of cellulose ethers by the reaction of etherifying agents on cellulosic substances in the presence of a base, which comprises carrying out the etherification in the presence of a wetting agent which is at least partly soluble in the reaction mixture, is inert toward the reactants, and has the property of effecting a substantial reduction in the interfacial tension between the etherifying agent and the alkali cellulose.

7. Process for the preparation of cellulose ethers, which comprises reacting alkali cellulose with an etherifying agent in the presence of a wetting agent which is at least partly soluble in the reaction mixture, is inert toward the reactants, and has the property of effecting a substantial reduction in the interfacial tension between the etherifying agent and the alkali cellulose, and continuing the etherification reaction until the cellulose ether product is substantially soluble in a 20-80 alcohol-toluol mixture.

8. Process of claim 7, wherein the wetting agent is present in an amount of approximately 5% to 10%.

9. Process of claim 7 in which the wetting agent is a mixture of the sodium salts of sulfuric acid esters of saturated aliphatic alcohols, and is present in an amount of approximately 5% to 10% based on the cellulose.

10. Process of claim 7 in which the wetting agent is a mixture of the sodium salts of sulfuric acid esters of saturated aliphatic alcohols.

11. The method for the preparation of aralkyl ethers of cellulose which includes treating at reaction temperature alkali cellulose with an aralkyl halide in the presence of a wetting agent essentially comprising the alkali salts of a mixture of aliphatic acids obtained by the oxidation of higher alcohols obtainable by the catalytic hydrogenation of carbon oxides.

12. The method for the preparation of benzyl cellulose which includes treating at reaction temperature alkali cellulose with benzyl chloride in the presence of a wetting agent comprising essentially a mixture of the sodium salts of saturated aliphatic monobasic acids having from 4 to 8 carbon atoms.

13. The method for the preparation of ethyl cellulose which includes treating at reaction temperature alkali cellulose with ethyl chloride in the presence of a wetting agent which is at least partly soluble in the reaction mixture, is inert toward the reactants, and has the property of effecting a substantial reduction in the interfacial tension between the etherifying agent and the alkali cellulose.

14. The method for the preparation of alkyl ethers of cellulose which includes treating at reaction temperature cellulose with a cellulose alkylating agent in the presence of alkali and a wetting agent which is at least partly soluble in the reaction mixture, is inert toward the reactants, and has the property of effecting a substantial reduction in the interfacial tension between the etherifying agent and the alkali cellulose.

15. Process for the preparation of cellulose ethers, which comprises reacting alkali cellulose with an etherifying agent in the presence of a wetting agent which is a mixture of the sodium salts of saturated aliphatic monobasic acids having from 4 to 8 carbon atoms, and continuing the etherification reaction until the cellulose ether product is substantially soluble in a 20-80 alcohol-toluol mixture.

16. Process for the preparation of cellulose ethers, which comprises reacting alkali cellulose with an etherifying agent in the presence of a wetting agent which is a mixture of the sodium salts of saturated aliphatic monobasic acids having from 4 to 8 carbon atoms, and is present in an amount of approximately 5% to 10% based on the cellulose, and continuing the etherification reaction until the cellulose ether product is substantially soluble in a 20-80 alcohol-toluol mixture.

17. The method for the preparation of ethers of cellulose which includes treating at reaction temperature alkali cellulose with a cellulose etherifying agent in the present of a wetting agent for alkali cellulose soluble in the etherifying agent.

18. The method for the preparation of ethers of cellulose which includes treating at reaction temperature cellulose with a cellulose etherifying agent in the presence of alkali and a wetting agent essentially comprising the alkali salts of a mixture of aliphatic acids obtained by the oxidation of higher alcohols obtainable by the catalytic hydrogenation of carbon oxides.

19. The method for the preparation of ethers of cellulose which includes treating at reaction temperature cellulose with a cellulose etherifying agent in the presence of alkali and a wetting agent which is a mixture of the alkali metal salts of saturated aliphatic monobasic acids having from 4 to 8 carbon atoms.

20. The method for the preparation of ethers of cellulose which includes treating at reaction temperature cellulose with a cellulose etherifying agent in the presence of alkali and a wetting agent essentially comprising an alkali metal isobutyrate.

FREDERICK C. HAHN.